US012217926B2

(12) United States Patent
Daugherty

(10) Patent No.: US 12,217,926 B2
(45) **Date of Patent: *Feb. 4, 2025**

(54) MULTI-LAYER VACUUM ELECTRON DEVICE AND METHOD OF MANUFACTURE

(71) Applicant: ELVE INC., Davis, CA (US)

(72) Inventor: Diana Gamzina Daugherty, Davis, CA (US)

(73) Assignee: Elve Inc., Davis, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,175

(22) Filed: Feb. 5, 2024

(65) Prior Publication Data

US 2024/0242916 A1 Jul. 18, 2024

Related U.S. Application Data

(63) Continuation of application No. 17/525,658, filed on Nov. 12, 2021, now Pat. No. 11,894,208.

(Continued)

(51) Int. Cl.
*H01J 23/083* (2006.01)
*H01J 9/18* (2006.01)
(Continued)

(52) U.S. Cl.
CPC .............. *H01J 23/083* (2013.01); *H01J 9/18* (2013.01); *H01J 23/06* (2013.01); *H01J 23/165* (2013.01);
(Continued)

(58) Field of Classification Search
None
See application file for complete search history.

(56) References Cited

U.S. PATENT DOCUMENTS 2,841,739 A 4/1953 Pierce
2,845,571 A 7/1958 Kazan
(Continued)

FOREIGN PATENT DOCUMENTS

CN 108682605 A 10/2018
CN 109273337 A 1/2019
(Continued)

OTHER PUBLICATIONS

Baig, A., et al., "Performance of a Nano-CNC Machined 220-GHz TWT Amplifier", IEEE Trans. on Electron Devices, vol. 64, No. 5, pp. 2390-2397, May 1, 2017.
(Continued)

*Primary Examiner* — Wilson Lee
(74) *Attorney, Agent, or Firm* — Sheppard Mullin Richter & Hampton LLP

(57) ABSTRACT

Vacuum electron devices (VEDs) having a plurality of two-dimensional layers of various materials are bonded together to form one or more VEDs simultaneously. The two-dimensional material layers are machined to include features needed for device operation so that when assembled and bonded into a three-dimensional structure, three-dimensional features are formed. The two-dimensional layers are bonded together into a sandwich-like structure. The manufacturing process enables incorporation of metallic, magnetic, ceramic materials, and other materials required for VED fabrication while maintaining required positional accuracy and multiple devices per batch capability.

20 Claims, 10 Drawing Sheets

Related U.S. Application Data

(60) Provisional application No. 63/198,915, filed on Nov. 21, 2020, provisional application No. 63/198,817, filed on Nov. 15, 2020.

(51) Int. Cl.

| | |
|---|---|
| ***H01J 23/06*** | (2006.01) |
| ***H01J 23/16*** | (2006.01) |
| ***H01J 29/62*** | (2006.01) |
| ***H01J 29/70*** | (2006.01) |
| *H01J 25/34* | (2006.01) |

(52) U.S. Cl.
CPC .............. *H01J 29/62* (2013.01); *H01J 29/70* (2013.01); *H01J 25/34* (2013.01); *H01J 2229/581* (2013.01); *H01J 2229/582* (2013.01)

(56) References Cited

U.S. PATENT DOCUMENTS

| | | | | |
|---|---|---|---|---|
| 5,744,910 | A | 4/1998 | Symons | |
| 5,848,925 | A | 12/1998 | Howard et al. | |
| 5,986,388 | A | 11/1999 | Makishima | |
| 6,236,164 | B1 | 5/2001 | Beeteson et al. | |
| 6,538,367 | B1 | 3/2003 | Choi et al. | |
| 7,279,686 | B2 | 10/2007 | Schneiker | |
| 8,547,006 | B1 * | 10/2013 | Ives | H01J 25/10 313/446 |
| 8,723,137 | B1 | 5/2014 | Hwu et al. | |
| 8,766,541 | B1 | 7/2014 | Hoff et al. | |
| 9,105,440 | B2 | 8/2015 | Chen et al. | |
| 9,819,320 | B1 * | 11/2017 | Hoff | H01J 23/06 |
| 10,714,292 | B2 | 7/2020 | Luhmann, Jr. et al. | |
| 2002/0145376 | A1 | 10/2002 | Kakesu et al. | |
| 2005/0023984 | A1 | 2/2005 | Vancil et al. | |
| 2008/0024236 | A1 | 1/2008 | Dayton | |
| 2008/0272698 | A1 * | 11/2008 | Dayton | H01J 25/34 315/3.5 |
| 2010/0327743 | A1 | 12/2010 | Durand et al. | |
| 2011/0006678 | A1 | 1/2011 | Ferguson | |
| 2011/0064414 | A1 | 3/2011 | Kowalczyk et al. | |
| 2013/0037716 | A1 | 2/2013 | Tadaka et al. | |
| 2013/0168465 | A1 | 7/2013 | Okamura | |
| 2014/0353576 | A1 | 12/2014 | Patti | |
| 2016/0099127 | A1 * | 4/2016 | Aditya | H01J 23/28 315/39 |
| 2016/0260595 | A1 | 9/2016 | Barofsky et al. | |
| 2019/0057830 | A1 * | 2/2019 | Ferrari | H01J 3/022 |
| 2019/0074154 | A1 | 3/2019 | Woodman et al. | |
| 2021/0280384 | A1 * | 9/2021 | Bhosale | H01J 23/12 |
| 2022/0157550 | A1 | 5/2022 | Daughterty | |

FOREIGN PATENT DOCUMENTS

| | | | |
|---|---|---|---|
| EP | 2546385 | A1 | 3/2011 |
| FR | 2925217 | A1 | 6/2009 |
| JP | 7-99026 | A | 4/1995 |
| JP | H0831304 | A | 2/1996 |
| JP | 8-255558 | A | 10/1996 |
| JP | H08339773 | A | 12/1996 |
| JP | 10-74445 | A | 3/1998 |
| JP | 2001057146 | A | 2/2001 |
| JP | 2007502522 | A | 2/2007 |
| JP | 2008519423 | A | 6/2008 |
| JP | 2014107143 | A | 6/2014 |
| JP | 6-139944 | B2 | 5/2017 |
| TW | 201511065 | A | 3/2015 |
| WO | 2005017938 | A2 | 2/2005 |
| WO | 2006052549 | A2 | 5/2006 |
| WO | 2008133515 | A2 | 11/2008 |
| WO | 2019177835 | A1 | 9/2019 |

OTHER PUBLICATIONS

Gamzina, D., et al., "Mechanical Design and Manufacturing of W-Band Sheet Beam Klystron", IEEE Trans. on Electron Devices, vol. 64, No. 6, pp. 2675-2682, Jun. 1, 2017.
Johnson, H.S., et al., "A 10-watt electro-statically focused TWT for satellite telemetry", 1960 IEDM, IEEE, Oct. 27, 1960.
Wikipedia, "Halbach Array", Sep. 9, 2021.
Vancil, K.B., et al., "A Low Cost TWT for Wireless Communications", IEEE, 2002 IEEE MT T-S Int'l Microwave Symposium Digest, Jun. 2, 2002.
Scott, Allan W., "Why a Circuit Sever Affects TWT Efficiency", IEEE Trans. on Electron Devices, pp. 35-40, Jan. 1, 1962.
radartutorial.eu, "Travelling Wave Tube", Feb. 10, 2021.
ISR in Related Case PCT-US2021-0529277 Dated Mar. 21, 2022.
ISR in Related Case PCT-US2021-0529279 Dated May 11, 2022.
Taiwan IPO Search Report in Related Application (#110142439).

* cited by examiner

MULTI-LAYER VACUUM ELECTRON DEVICE AND METHOD OF MANUFACTURE

PRIORITY CLAIM

The present application is a continuation application of U.S. patent application Ser. No. 17/525,658, filed Nov. 12, 2021, and entitled "Multi-Layer Vacuum Electron Device And Method Of Manufacture," which claims the benefit of U.S. Provisional Patent Application Ser. No. 63/198,817, filed on Nov. 15, 2020, entitled "Multi-Layered Multi-Material Manufacturing Process For Vacuum Electronic Devices" and U.S. Provisional Patent Application Ser. No. 63/198,915, filed on Nov. 21, 2020, entitled "Electronic Magneto-Electrostatic Sensing, Focusing, And Steering Of Electron Beams In Microwave, Millimeter Wave, And Near-Terahertz Vacuum Electronic Devices", which are hereby incorporated by reference herein.

The present application may be considered related to U.S. patent application Ser. No. 17/525,698, filed on Nov. 12, 2021 and entitled "Magneto-Electrostatic Sensing, Focusing, and Steering of Electron Beams in Vacuum Electron Devices", which claims the benefit of U.S. Provisional Patent Application Ser. No. 63/198,817, filed on Nov. 15, 2020, entitled "Multi-Layered Multi-Material Manufacturing Process For Vacuum Electronic Devices" and U.S. Provisional Patent Application Ser. No. 63/198,915, filed on Nov. 21, 2020, entitled "Electronic Magneto-Electrostatic Sensing, Focusing, And Steering Of Electron Beams In Microwave, Millimeter Wave, And Near-Terahertz Vacuum Electronic Devices". U.S. patent application Ser. No. 17/525,698 is hereby incorporated by reference.

TECHNICAL FIELD

The present disclosure relates generally to a manufacturing process used for the fabrication of vacuum electron devices (VEDs) having a plurality of two-dimensional layers of various materials that are bonded together to form one or more VEDs simultaneously. The two-dimensional material layers are machined to include features needed for device operation so that when assembled and bonded into a three-dimensional structure, three-dimensional features are formed. The two-dimensional layers are bonded together into a sandwich-like structure. The manufacturing process enables incorporation of metallic, magnetic, ceramic materials, and other materials required for VED fabrication while maintaining required positional accuracy and multiple devices per batch capability.

BACKGROUND

Vacuum electron devices (VEDs) operate in a vacuum environment and take advantage of the interaction between one or more electron beam(s) and an electromagnetic field generated in an interaction region of the VED. The construction of a VED requires incorporation of metallic, ceramic, magnetic and other materials into a single assembly which may be held at or enclosed in a vacuum so as not to impede the transit of electrons from a cathode (electron emitter) to a collector (electron receptor) of the vacuum electron device. The vacuum region is also referred to as a vacuum chamber or cavity or tunnel (electron beam tunnel) or RF interaction region and is where the interaction between the electron beam(s) and the electromagnetic wave(s) takes place. Examples of such VEDs in the prior art include (but are not limited to) particle accelerators, klystrons, gyrotrons, gyro-klystrons, gyro-amplifiers, travelling wave tubes (TWTs), gyro-TWTs, backward wave oscillators, inductive output tubes (IOTs), magnetrons, cross-field amplifiers, free electron lasers, ubitrons, masers, diodes, triodes, tetrodes, pentodes, and the like. Some gas ion lasers, while not strictly operating at a vacuum but at a very low pressure, and generally lacking an RF interaction region, operate in much the same manner.

Prior VEDs were generally manufactured using individual two- and three-dimensional subcomponents, forming the subcomponents into an assembly, bonding the assembly to an envelope to provide a structural support and a vacuum envelope, and then carrying out conventional vacuum processing and sealing procedures to yield a functioning VED. Such procedures could take, depending upon the complexity of the device, weeks or more to complete a single device and utilized a great deal of highly skilled hands-on labor and large clean rooms in which to carry out the procedures. Today, as wireless high bandwidth data communications demand is exploding from earth stations to satellites to cell towers and local WIFI systems and ground backbone systems, a substantial need exists for large quantities of such devices at lower cost.

SUMMARY

The subject matter described herein generally relates to the manufacturing of vacuum electron devices (VEDs) utilizing parallel sheets of materials which are assembled in a stack and bonded together to form a three-dimensional VED. An advantage of this approach is that a plurality of VEDs may be manufactured simultaneously in the same structure and simply cut apart when complete for individual use much like is commonly done in semiconductor device fabrication, thus reducing the per-device manufacturing cost significantly.

The foregoing overview is a summary and thus may contain simplifications, generalizations, and omissions of detail; consequently, those skilled in the art will appreciate that the overview is illustrative only and is not intended to be in any way limiting.

BRIEF DESCRIPTION OF THE DRAWINGS

The accompanying drawings, which are incorporated into and constitute a part of this specification, illustrate one or more exemplary embodiments and, together with the description of the exemplary embodiments, serve to explain the principles and implementations of the invention.

In the drawings.

DESCRIPTION OF EXAMPLE EMBODIMENTS

Figure 1:
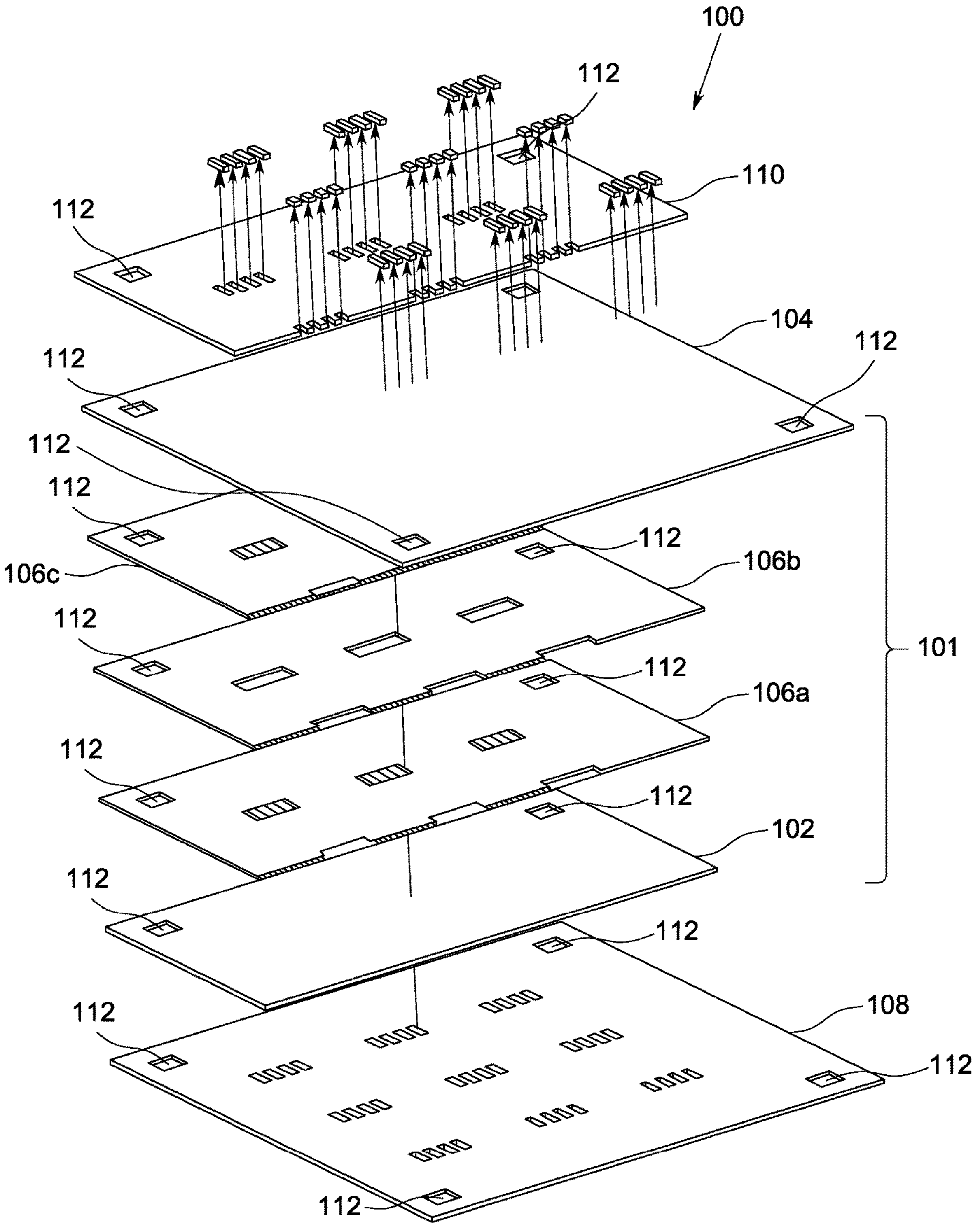
FIG. 1 is an exploded perspective view of a multilayer multi-material assembly for a VED in accordance with one embodiment which incorporates conductive and magnetic material layers while creating three-dimensional openings for electron beam propagation and electromagnetic wave interaction.

Exemplary embodiments are described herein in the context of a VED such as a TWT (commonly used for RF signal amplification in high-bandwidth data communications systems). Those of ordinary skill in the art will realize that the following description is illustrative only and is not intended to be in any way limiting. Other embodiments will readily suggest themselves to such skilled persons having the benefit of this disclosure. Reference will now be made in detail to implementations of the exemplary embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

References herein to "one embodiment" or "an embodiment" or "one implementation" or "an implementation" and the like means that a particular feature, structure, part, function or characteristic described in connection with an exemplary embodiment can be included in at least one exemplary embodiment. The appearances of phrases such as "in one embodiment" or "in one implementation" and the like in different places within this specification are not necessarily all referring to the same embodiment or implementation, nor are separate and alternative embodiments necessarily mutually exclusive of other embodiments.

In accordance with this disclosure, the components and process steps described herein may be implemented using various techniques without departing from the scope and spirit of the inventive concepts disclosed herein.

What is described here includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments, examples and implementations are described herein for illustrative purposes, various modifications are possible that are considered within the scope of such embodiments and examples, as those skilled in the relevant art can recognize.

In particular and in regard to the various functions performed by the above described components, devices, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

In addition, while a particular feature of the subject invention may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In the figures, where a callout number or reference symbol is used in more than one figure, it is intended to refer to the same or a similar part, component or step, unless clearly not so intended from the contents of the disclosure.

The devices and methods described herein can be employed for VEDs utilizing pencil beams, sheet beams, rectangular beams, elliptical beams, hollow beams, distributed beams and multiple beams.

While most of the description below is addressed to building a VED in layers from below the electron beam to above the electron beam with plates arrayed parallel to the electron beam, it is also contemplated that such a device may be constructed orthogonal to the electron beam in a relatively straightforward manner given the teachings herein. Such a device may also be constructed at an arbitrary angle to the electron beam if desired, as, for example, in a distributed beam device.

A key benefit of the present invention is its ability to permit the simultaneous fabrication of a plurality of VEDs in one batch and then cut them into individual components, although using this invention to make even single prototype devices has proven to be much more cost effective than prior technologies.

Typically, magnets are used to provide at least some of the electron beam forming and aiming functions in a VED. If the electron beam is not properly directed from the cathode to the collector it may impinge upon some other part of the VED structure, causing damage and contaminating the vacuum area. The ability to incorporate a variety of magnet material types is beneficial to the assembly of VEDs. Hallbach, or quadrupole arrays are often employed for focusing the electron beam as are solenoids deployed about the electron beam at some distance from it. Another key benefit of the present invention is its ability to provide a higher strength magnetic field at the electron beam for a given magnet (electromagnetic solenoid or fixed) because the invention allows the magnets to be brought much closer to the electron beam without placing them within the vacuum chamber. Since the magnetic field from a magnet decreases with the square of the distance from the magnet the magnets may be brought closer and thus made smaller by means of the present invention. The magnetic steering can be performed by means of actual magnets as well as a combination of magnets and magnetically susceptible materials which, in conjunction with the magnets, establish desired magnetic fields within the VED to properly steer the electron beam. Since magnetic materials and/or iron- and nickel-containing materials are not good electrical conductors, the electromagnetic circuit is typically made of materials like copper (or tungsten for helix-type devices) moving the focusing structure further from the electron beam. The magnets and/or iron- and nickel-containing materials can be electroplated with high electrical conductivity materials such as copper and employed to alleviate this problem, however such an arrangement can create potential vacuum purity issues for the VED as such materials can degrade over time in a VED. It is possible to use vacuum double-melted iron with high quality nickel plating inside the vacuum envelope. Permanent magnetic materials such as SmCo and NbFeB in most cases would have to be added outside the vacuum envelope (because heating a permanent magnet above its Curie point will cause it to lose its magnetism) and low temperature bonding techniques used (adhesives or solid state ultrasonic) to secure such materials in place.

In one embodiment, magnets may be added to the circuits of the present invention as follows. To join the copper sheets to create a TWT circuit (for example) each sheet will be sputter coated with a few-hundred nanometer thick gold or silver layer and then bonded to an adjacent layer in a hydrogen furnace at around 1000 degrees centigrade with about a 50-pound weight or in a fixture to secure the layers in place. To add a magnetic assembly to the layered copper circuit assembly, the iron (vacuum double-melted) or stainless-steel layer(s) will be nickel plated with pockets for magnet pieces and copper-gold or copper-silver braze shims (about 25 microns thick) may be used for creating a braze joint. The iron/stainless steel layers will then be brazed to the copper circuit assembly, but remain outside the vacuum region of the VED, by melting the braze shim. Magnet pieces will then be inserted into the premade pockets in the assembly and another material layer will be added over the magnets and secured using low temperature adhesives to hold the magnets in place.

Electrostatic focusing may also be used to provide some of the electron beam forming and aiming functions in a VED. The ability of the present invention to introduce electrical conductors into the vacuum structure now permits the use of precise electrostatic focusing within the vacuum structure by applying a voltage across two or more plates disposed about the electron beam. A number of sets of such plates may be employed if desired or required by the specific application.

The manufacturing approach described herein can be employed for manufacturing VEDs at a variety of frequencies, but it is especially beneficial for VEDs operating between about 25 GHz and about 1 THz. The manufacture of such devices using conventional manual device assembly is challenging due to the small feature scale (micrometers to millimeters in some cases).

Turning now to the figures, FIG. 1 is an exploded perspective view of a multilayer multi-material assembly for a VED in accordance with one embodiment which incorporates conductive and magnetic material layers while creating three-dimensional openings for electron beam propagation and electromagnetic wave interaction.

In the embodiment illustrated in FIG. 1 the VED 100 comprises an assembly 101 having first planar non-magnetic electrically conductive plate 102 formed of an electrically conductive material such as copper, a second planar non-magnetic electrically conductive plate 104 formed of an electrically conductive material such as copper, a plurality of planar non-magnetic interaction structure forming plates 106*a*, 106*b* and 106*c* disposed between the first planar non-magnetic electrically conductive plate 102 and the second planar non-magnetic electrically conductive plate 104. Where external fixed magnetic fields are to be used for electron beam control, assembly 101 may be disposed against a first planar magnetic plate formed of a magnetic material such as iron, nickel or the like and including disposed thereon or embedded therein one or more permanent magnets. Alternatively, a sandwich may be formed of two such plates 108 and 110 so that assembly 101 is disposed between first planar magnetic plate 108 and second planar magnetic plate 110. Alignment features (discussed below in more detail) 112 may be provided to provide a simple mechanism for aligning the plurality of parallel plates. It is also contemplated that the magnet layers could comprise solid planar permanent magnets rather than being made of a plurality of smaller magnets. This approach would allow for planar "solenoidal field" magnetic focusing.

Where desired, an electrically conductive plate may be coated on one or both sides with a vacuum-appropriate insulator, such as sputtered alumina ($Al_2O_3$) or another convenient insulator that will not outgas into a vacuum environment heated by the presence of an electron beam in order to build more complex circuits.

Figure 2:
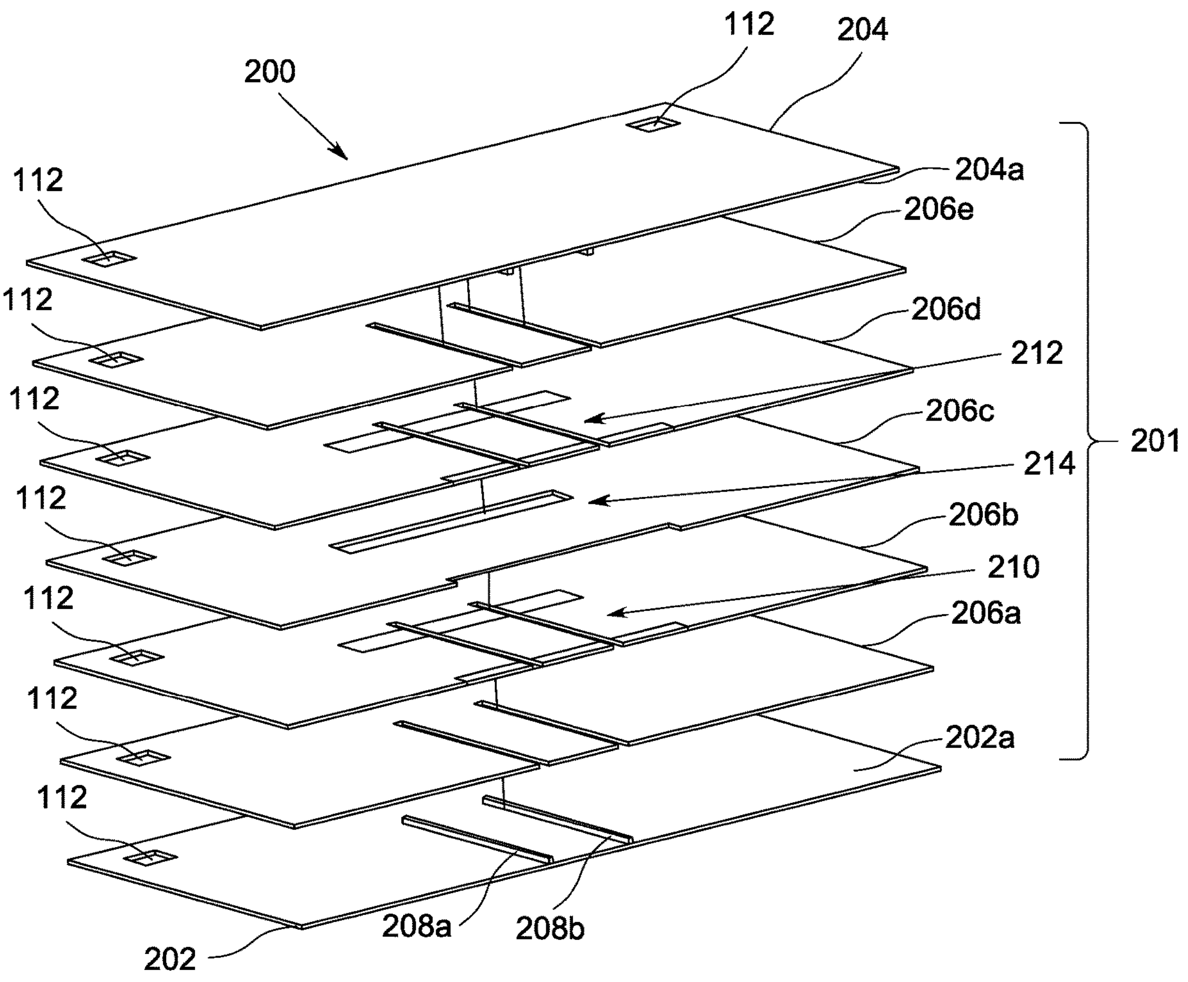
FIG. 2 is an exploded perspective view of a multilayer multi-material assembly for a VED in accordance with another embodiment which incorporates conductive and magnetic material layers as well as insulator layers while creating three-dimensional openings for electron beam propagation and electromagnetic wave interaction.

FIG. 2 is an exploded perspective view of a multilayer multi-material assembly for a VED in accordance with another embodiment which incorporates conductive and magnetic material layers as well as insulator layers while creating three-dimensional openings for electron beam propagation and electromagnetic wave interaction.

In the embodiment illustrated in FIG. 2 the VED 200 comprises an assembly 201 having first planar non-magnetic electrically conductive plate 202 formed of an electrically conductive material such as copper, a second planar non-magnetic electrically conductive plate 204 formed of an electrically conductive material such as copper, a plurality of planar non-magnetic interaction structure forming plates 206*a*, 206*b*, 206*c*, 206*d* and 206*e* disposed between the first planar non-magnetic electrically conductive plate 202 and the second planar non-magnetic electrically conductive plate 204. Where external fixed magnetic fields are to be used for electron beam control, assembly 201 may be disposed against a first planar magnetic plate formed of a magnetic material such as iron, nickel or the like and including disposed thereon or embedded therein one or more permanent magnets as shown in FIG. 1. Alternatively, a sandwich may be formed of two such plates 108 and 110 so that assembly 201 is disposed between first planar magnetic plate 108 and second planar magnetic plate 110 as shown in FIG. 1. Alignment features (discussed below in more detail) 112 may be provided to provide a simple mechanism for aligning the plurality of parallel plates. In accordance with the embodiment of FIG. 2, the "interior" of plates 202 and 204 (i.e., those labeled 202*a* and 204*a*) are coated with an electrical insulator to form an insulating surface so that the assembly of plates 206*a*, 206*b*, 206*c*, 206*c*, 206*d* and 206*e* can float with respect to plates 202 and 204. In this manner, an electrostatic field caused by a voltage differential applied across plates 202 and 204 can be used for electron beam control either together with or separately from magnetic beam control as discussed above. Additionally, conductors placed on the electrical insulator can deliver electrical current to specific locations within the assembly as desired. For example, such conductors may deliver to and extract from the interaction region an RF signal. They may also be used to deliver fixed or varying voltages for the control of other components within the VED as well.

In the embodiment of FIG. 2, a pair of electrical conductors 208*a*, 208*b* are disposed upon insulating surface 202*a*. Not shown is that the same arrangement is provided on insulating surface 204*a*. The electrical conductors 208*a*, 208*b* may be deposited or they may be placed. They should be appropriate for a vacuum environment, i.e., no outgassing under the high temperatures expected in a VED. Plates 206*a* and 206*e* include openings as shown to isolate the corresponding electrical conductors, e.g., 208*a*, 208*b* from contact with plates 206*a* and 206*e*. Plates 206*b* and 206*d* contain, respectively, the lower interaction structure 210 and the upper interaction structure 212 and plate 206*c* contains the electron beam tunnel 214 which is thereby surrounded by the lower interaction structure 210 and the upper interaction structure 212.

Figure 3:
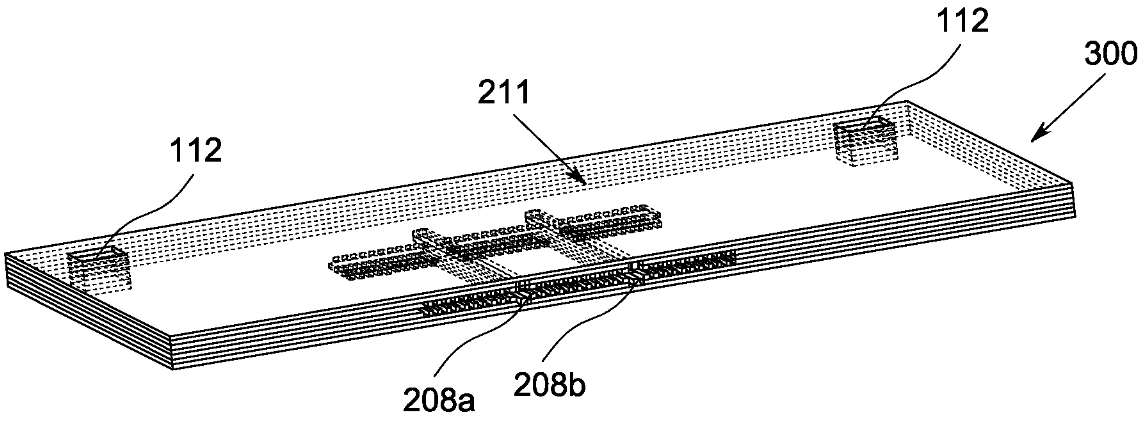
FIG. 3 is a transparent section view of a multilayer multi-material assembly for a VED which incorporates conductive and magnetic material layers while creating three-dimensional openings for electron beam propagation and electromagnetic wave interaction.

FIG. 3 is a transparent section view of a multilayer multi-material assembly 300 for a VED which incorporates conductive and magnetic material layers while creating three-dimensional openings for electron beam propagation and electromagnetic wave interaction. It is, in essence, a view into the structure formed when the components of FIG. 2 are bonded together as intended.

Figure 4:
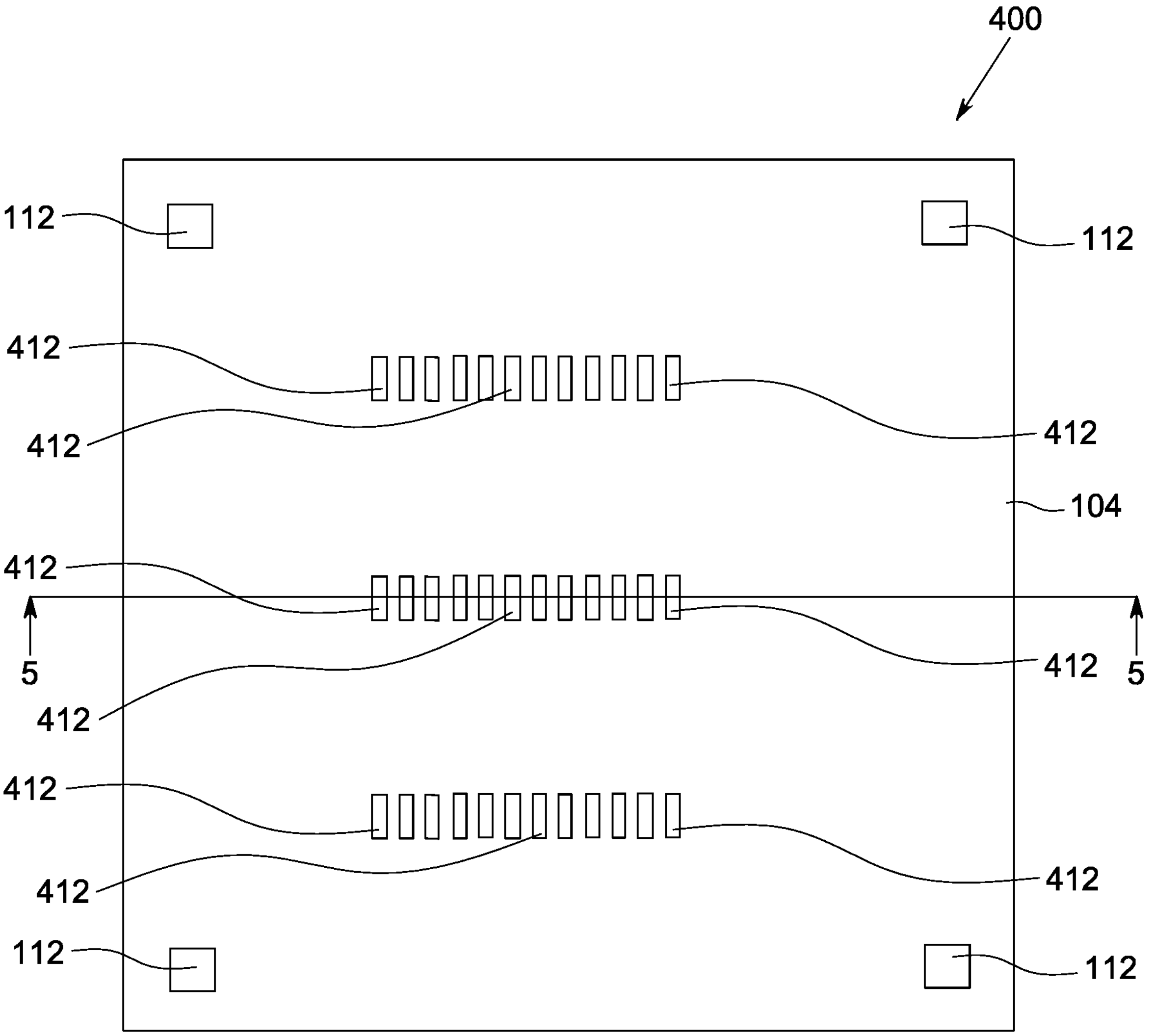
FIG. 4 is a top plan view of a multilayer multi-material assembly for a trio of VEDs which incorporates conductive and magnetic material layers while creating three-dimensional openings for electron beam propagation and electromagnetic wave interaction.

FIG. 4 is a top plan view of a multilayer multi-material assembly for a trio of VEDs 400 which incorporates conductive and magnetic material layers while creating three-dimensional openings for electron beam propagation and electromagnetic wave interaction.

Figure 5:
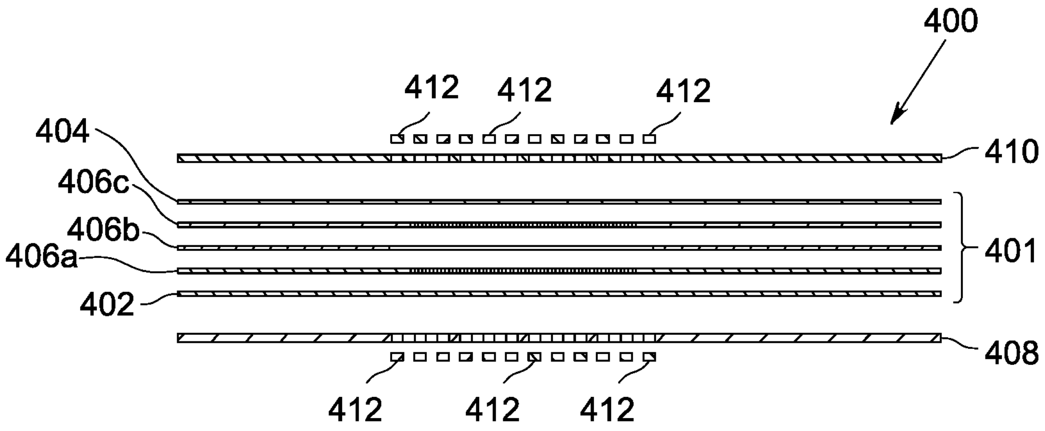
FIG. 5 is a cross-sectional view taken along line 5-5 of FIG. 4 illustrating the internal structure of a single multilayer multi-material assembly for a VED which incorporates conductive and magnetic material layers while creating three-dimensional openings for electron beam propagation and electromagnetic wave interaction.

FIG. 5 is a cross-sectional view taken along line 5-5 of FIG. 4 illustrating the internal structure of a single multi-layer multi-material assembly for a VED 400 which incorporates conductive and magnetic material layers while creating three-dimensional openings for electron beam propagation and electromagnetic wave interaction.

In the embodiment illustrated in FIGS. 4 and 5 the VED 400 comprises an assembly 401 having first planar non-magnetic electrically conductive plate 402 formed of an electrically conductive material such as copper, a second planar non-magnetic electrically conductive plate 404 formed of an electrically conductive material such as copper, a plurality of planar non-magnetic interaction structure forming plates 406*a*, 406*b* and 406*c* disposed between the first planar non-magnetic electrically conductive plate 402 and the second planar non-magnetic electrically conductive plate 404. In this embodiment external fixed magnetic fields are to be used for electron beam control, therefore assembly 401 (also known as a "circuit assembly") is disposed between a first planar magnetic plate 408 formed of a magnetic material such as iron, nickel or the like and including disposed thereon or embedded therein one or more permanent magnets 412. Alternatively, a sandwich may be formed of two such plates 408 and 410 so that assembly 401 is disposed between first planar magnetic plate 408 and second planar magnetic plate 410. Alignment features (discussed in more detail below) may be provided to provide a simple mechanism for aligning the plurality of parallel plates during fabrication.

Figure 6:
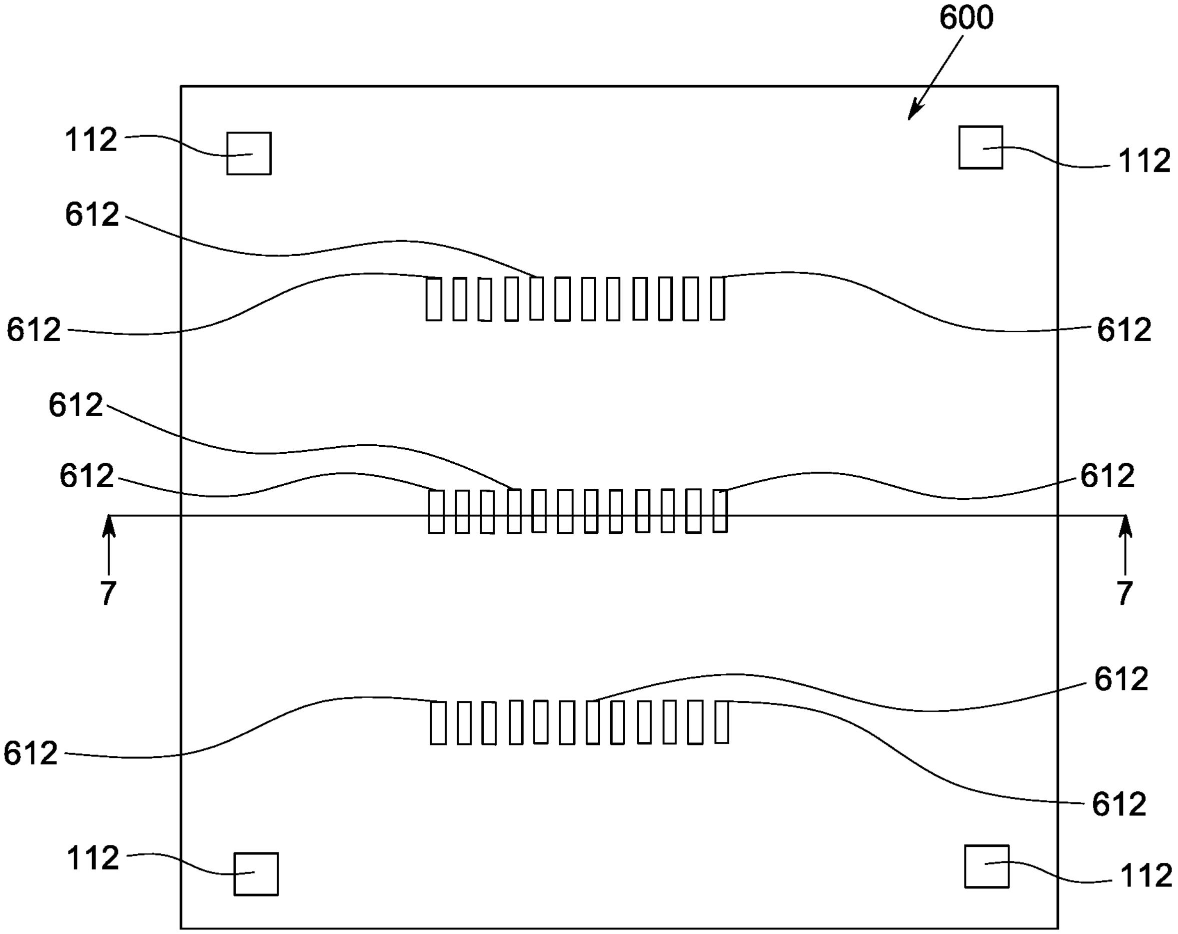
FIG. 6 is a top plan view of a multilayer multi-material assembly for a trio of VEDs which incorporates conductive and magnetic material layers while creating three-dimensional openings for electron beam propagation and electromagnetic wave interaction.

FIG. 6 is a top plan view of a multilayer multi-material assembly for a trio of VEDs 600 which incorporates conductive and magnetic material layers while creating three-dimensional openings for electron beam propagation and electromagnetic wave interaction.

Figure 7:
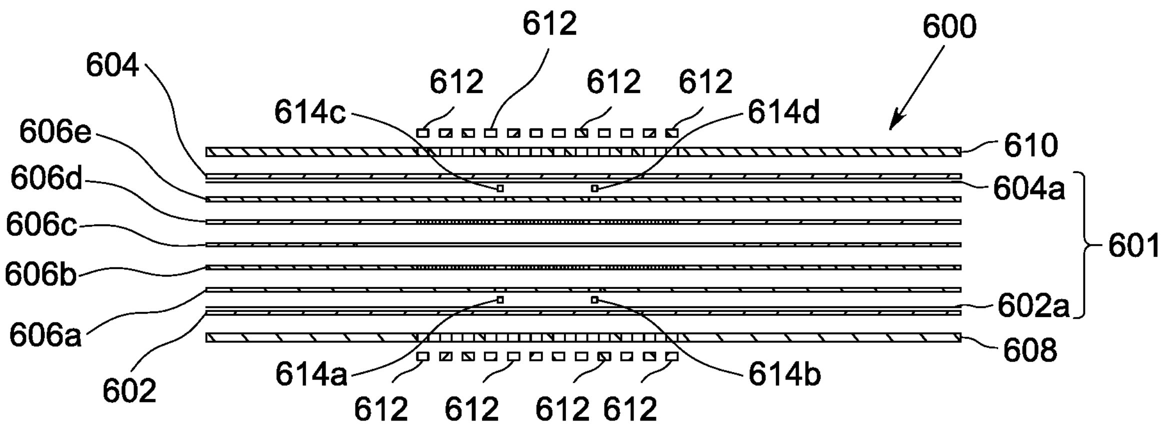
FIG. 7 is a cross-sectional view taken along line 7-7 of FIG. 6 illustrating the internal structure of a single multilayer multi—material assembly for a VED which incorporates conductive and magnetic material layers while creating three-dimensional openings for electron beam propagation and electromagnetic wave interaction.

FIG. 7 is a cross-sectional view taken along line 7-7 of FIG. 6 illustrating the internal structure of a single multi-layer multi-material assembly 600 for a VED which incorporates conductive and magnetic material layers while creating three-dimensional openings for electron beam propagation and electromagnetic wave interaction.

In the embodiment illustrated in FIGS. 6 and 7 the VED 600 comprises an assembly 601 having first planar non-magnetic electrically conductive plate 602 formed of an electrically conductive material such as copper, a second planar non-magnetic electrically conductive plate 604 formed of an electrically conductive material such as copper, a plurality of planar non-magnetic interaction structure forming plates 606*a*, 606*b*, 606*c*, 606*d* and 606*e* disposed between the first planar non-magnetic electrically conductive plate 602 and the second planar non-magnetic electrically conductive plate 604 In this embodiment external fixed magnetic fields are to be used for electron beam control, therefore assembly 601 (also known as a "circuit assembly") is disposed against a first planar magnetic plate 608 formed of a magnetic material such as iron, nickel or the like and including disposed thereon or embedded therein one or more permanent magnets 612. Alternatively, a sandwich may be formed of two such plates 608 and 610 so that assembly 601 is disposed between first planar magnetic plate 608 and second planar magnetic plate 610. Alignment features 112 (discussed in more detail below) may be provided to provide a simple mechanism for aligning the plurality of parallel plates during fabrication. In accordance with the embodiments of FIGS. 6 and 7, the "interior" of plates 602 and 604 (i.e., those surfaces labeled 602*a* and 604*a*) are coated with an electrical insulator to form an insulating surface so that the assembly of plates 606*a*, 606*b*, 606*c*, 606*c*, 606*d* and 606*e* can float with respect to plates 602 and 604. In this manner, an electrostatic field caused by a voltage differential applied across plates 202 and 204 can be used for electron beam control either together with or separately from magnetic beam control as discussed above. Additionally, conductors 614*a*, 614*b*, 614*c* and 614*d* placed on the electrical insulator (as shown here) can deliver electrical current to specific locations within the assembly as desired. For example, such conductors may deliver to and extract from the interaction region an RF signal. They may also be used to deliver fixed or varying voltages for the control of other components within the VED as well.

Figure 8:
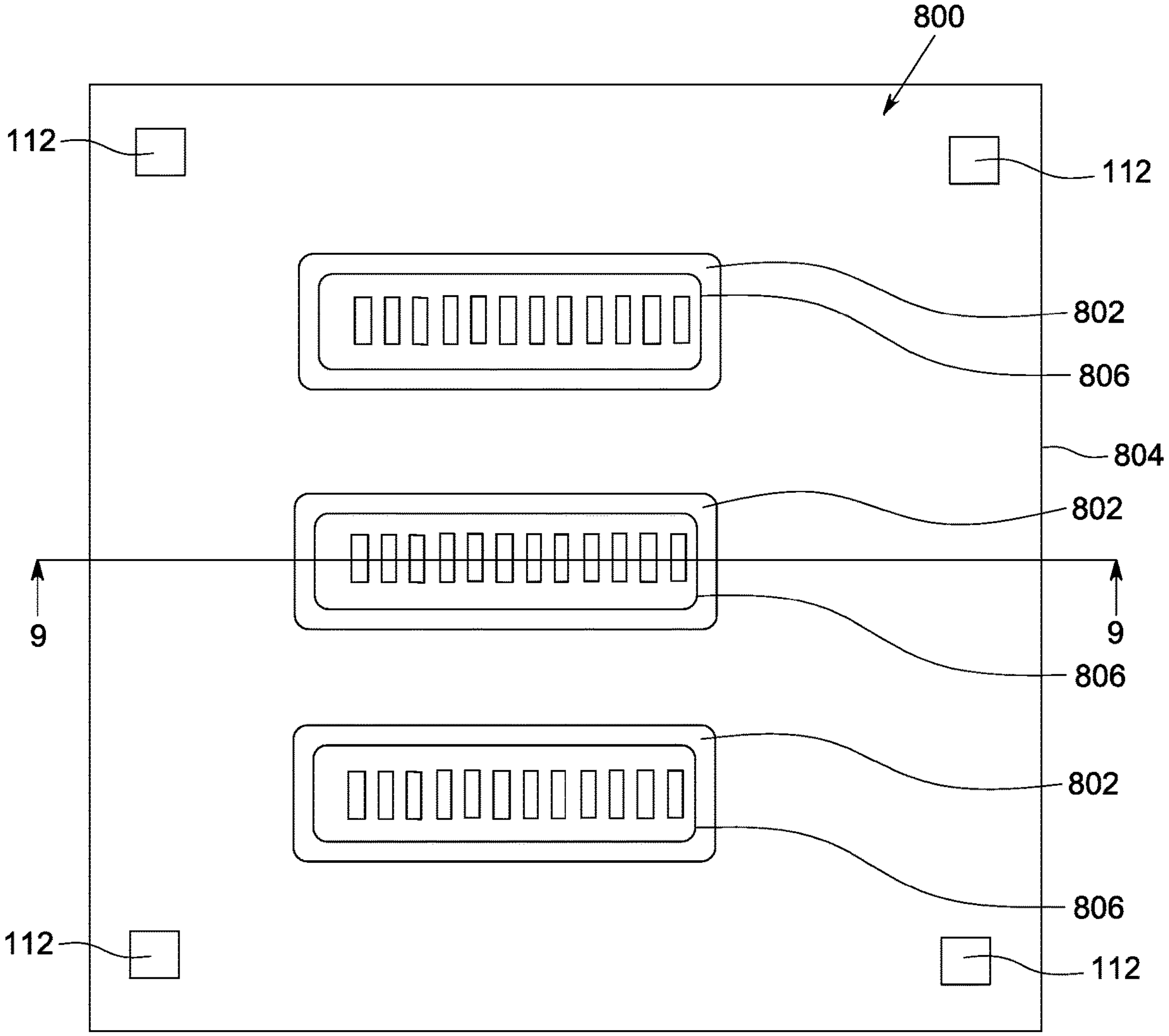
FIG. 8 is a top plan view of a multilayer multi-material assembly for a trio of VEDs which incorporates conductive and magnetic material layers while creating three-dimensional openings for electron beam propagation and electromagnetic wave interaction. This view is shown after cutting or otherwise creating a gap between the substrate assembly and individual VEDs.

FIG. 8 is a top plan view of a multilayer multi-material assembly for a trio of VEDs 600 which incorporates conductive and magnetic material layers while creating three-dimensional openings for electron beam propagation and electromagnetic wave interaction. This view is shown after cutting or otherwise creating a gap 802 between the substrate assembly 804 and individual VEDs 806.

Figure 9:
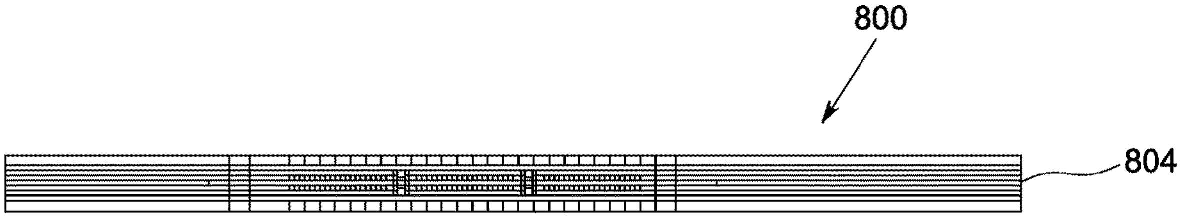
FIG. 9 is a cross-sectional view taken along line 9-9 of FIG. 8 illustrating the internal structure of a single multilayer multi-material assembly for VEDs which incorporate conductive and magnetic material layers while creating three-dimensional openings for electron beam propagation and electromagnetic wave interaction.

FIG. 9 is a cross-sectional view taken along line 9-9 of FIG. 8 illustrating the internal structure of a single multilayer multi-material assembly 800 for VEDs 806 which incorporate conductive and magnetic material layers while creating three-dimensional openings for electron beam propagation and electromagnetic wave interaction.

The gap 802 may be cut, diced, machined, punched or otherwise created in any conventional manner suitable for the cutting of such materials, e.g., laser, high-pressure water, diamond-bladed saw, and the like. Once the gap 802 is formed, the individual VEDs 806 may be removed and individually packaged for use in a conventional manner as would be known to those of ordinary skill in the art.

Figure 10:
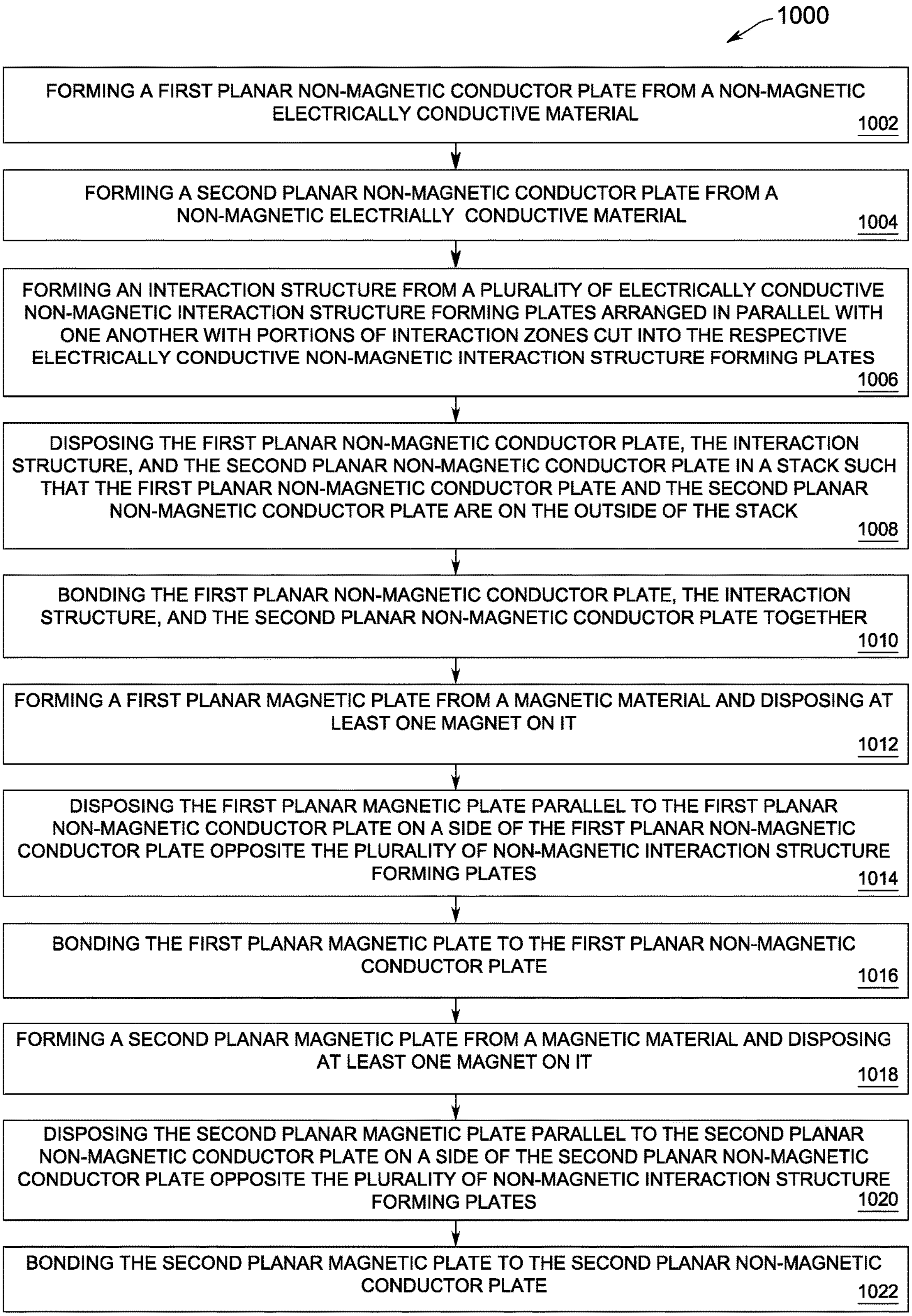
FIG. 10 is a flow chart illustrating a process or method for manufacturing a vacuum electron device in accordance with an embodiment of the invention.

FIG. 10 is a flow chart illustrating a process or method 1000 for manufacturing a vacuum electron device in accordance with an embodiment of the invention. The process steps described in connection with FIG. 10 may be carried out in sequence, or they may be carried out some or all at once.

At block 1002 is a first step: forming a first planar non-magnetic conductor plate from a non-magnetic electrically conductive material.

At block 1004 is a second step: forming a second planar non-magnetic conductor plate from a non-magnetic electrically conductive material.

At block 1006 is a third step: forming an interaction structure from a plurality of electrically conductive non-magnetic interaction structure forming plates arranged in parallel with one another with portions of interaction zones cut into the respective electrically conductive non-magnetic interaction structure forming plates.

At block 1008 is a fourth step: disposing the first planar non-magnetic conductor plate, the interaction structure, and the second planar non-magnetic conductor plate in a stack such that the first planar non-magnetic conductor plate and the second planar non-magnetic conductor plate are on the outside of the stack.

At block 1010 is a fifth step: bonding the first planar non-magnetic conductor plate, the interaction structure, and the second planar non-magnetic conductor plate together.

At block 1012 is a sixth step: forming a first planar magnetic plate from a magnetic material and disposing at least one magnet on it.

At block 1014 is a seventh step: disposing the first planar magnetic plate parallel to the first planar non-magnetic conductor plate on a side of the first planar non-magnetic conductor plate opposite the plurality of non-magnetic interaction structure forming plates.

At block 1016 is an eighth step: bonding the first planar magnetic plate to the first planar non-magnetic conductor plate.

At block 1018 is a ninth step: forming a second planar magnetic plate from a magnetic material and disposing at least one magnet on it.

At block 1020 is a tenth step: disposing the second planar magnetic plate parallel to the second planar non-magnetic conductor plate on a side of the second planar non-magnetic conductor plate opposite the plurality of non-magnetic interaction structure forming plates.

At block 1022 is an eleventh step: bonding the second planar magnetic plate to the second planar non-magnetic conductor plate.

Those of ordinary skill in the art will now realize that these steps can be performed in an order most convenient for manufacture and need not be carried out in lock step. For example: the bonding steps could all be carried out at one time; the forming steps can be carried out in advance to fabricate parts for later assembly; and the like.

In bonding the two-dimensional sheets together, the following processes may be used: brazing, diffusion bonding, assisted diffusion bonding, solid state bonding, cold welding, ultrasonic welding, a combination of one or more of the foregoing, and the like. The joint formed between two adjacent sheets should maintain a vacuum environment of better than $1\times10^{-6}$ Torr. The bonding should be carried out in a non-reactive environment such as: hydrogen, nitrogen, vacuum and the like. Prior to bonding, the respective layers should be cleaned or plasma etched to remove the surface oxide layer and maintained in a vacuum environment prior to bonding in order to assist the formation of a good leak-tight bond. Where needed, the respective layers may be coated (sputtered, electroplated, metallized and/or painted) with vacuum-compatible materials that enhance the creation of a vacuum compatible interface between the two respective layers (which may be dissimilar materials). The coatings may include one or more of: nickel, gold, silver, molybdenum-manganese, copper, copper-gold, copper-silver, titanium-nickel, gold-copper-titanium, copper-silver-titanium, copper-silver-titanium-aluminum, titanium-nickel-copper, gold-copper-titanium-aluminum, silver-copper-indium-titanium, copper-germanium, palladium-nickel-copper-silver, gold-palladium-manganese, silver-palladium, gold-copper-nickel, gold-copper-indium, silver-copper-indium, gold-nickel, gold-nickel-chromium, and the like. In this manner the bonded layers form a high-strength assembly resulting in relatively high-power handling capability and high gradient capability VEDs.

The layers may be coated as well (sputtered, electroplated, metallized and/or painted) with electrically insulating or electrically conductive materials to manage voltage potentials in the VED as well as heat flow. Coatings may also include materials designed to conduct heat (e.g., diamond films, diamond conduction channels, cooling channels, heat pipes, and the like) in order to better manage heat flow within and away from the VED. Layers may be fabricated of insulators (e.g., $Al_2O_3$) which are then plated with conductive paths in order to form electrodes and electrical paths with which to bias the electrodes.

Cutouts or pockets may be formed in the electrically conductive sheets of the VED using techniques such as milling, turning, electric discharge milling, lithography, etching, laser cutting, electron beam cutting, waterjet cutting, and the like. Cutouts and pockets so formed may be populated by such components as ceramic materials, vacuum windows, circuit sever materials (attenuators used to improve device stability), electron emissive materials, vacuum pumping materials, getter materials, magnets, iron pieces, shielding materials, isolating materials, conductor wires, connectors, wave guides, couplers and the like.

The incorporation of ceramic materials enables the addition of electrostatic beam forming lenses or areas within the VED to aid in focusing, propagating, guiding, steering, and ultimately improving electron beam propagation between the cathode and the collector. By building this capability into the VED itself, rather than providing it outside of the vacuum region of the VED, finer and lower-power consuming control of the electron beam is made possible.

The alignment of adjacent layers or sheets of materials with in the VED during the manufacturing process may be accomplished using alignment features 112. Such features may be alignment holes, alignment pins, rectangular features, combinations thereof, optical (visible) marks suitable for robotic assembly techniques, as discussed elsewhere herein, and the like. The assembly of the sheets may be effected by manual assembly, robotic assembly, translational stages, automatic translation, robotic placement, micro to nanoscale video alignment, vernier scales, and the like.

It is to be noted that the foregoing approach permits the construction of a VED without magnets altogether and using purely electrostatic focusing.

While exemplary embodiments and applications have been shown and described, it would be apparent to those skilled in the art having the benefit of this disclosure that numerous modifications, variations and adaptations not specifically mentioned above may be made to the various exemplary embodiments described herein without departing from the scope of the invention which is defined by the appended claims.

What is claimed is:

1. A vacuum electron device, comprising:

a first non-magnetic conductor plate having a first external surface and a first internal surface;

a second non-magnetic conductor plate having a second external surface and an second internal surface; and a plurality of non-magnetic interaction structure forming plates disposed between the first internal surface of the first non-magnetic conductor plate and the second internal surface of the second non-magnetic conductor plate, the plurality of non-magnetic interaction structure forming plates together forming a radio-frequency (RF) interaction structure housing an RF interaction region for transmitting an electron beam, the first non-magnetic conductor plate, the second non-magnetic conductor plate and the plurality of non-magnetic interaction structure forming plates being bonded together.

2. The vacuum electron device of claim 1, further comprising a first magnetic plate formed of a first magnetic material, the first magnetic plate being disposed on the external surface of the first non-magnetic conductor plate, and at least one first magnet on or in the first magnetic plate, the at least one first magnet configured for controlling the electron beam in the RF interaction region.

3. The vacuum electron device of claim 2, further comprising a second magnetic plate formed of a second magnetic material, the second magnetic plate being disposed on the second external surface of the second planar non-magnetic conductor plate, and at least one second magnet on or in the second magnetic plate, the at least one second magnet configured for further controlling the electron beam in the RF interaction region.

4. The vacuum electron device of claim 2, wherein one or more pockets are formed in the first non-magnetic conductor plate.

5. The vacuum electron device of claim 4, wherein at least one of the one or more pockets contains a getter material.

6. The vacuum electron device of claim 4, wherein at least one of the one or more pockets contains an electron emissive material.

7. The vacuum electron device of claim 4, wherein at least one of the one or more pockets contains a circuit sever material.

8. The vacuum electron device of claim 1, wherein each of the first non-magnetic conductor plate, the second non-magnetic conductor plate and the plurality of non-magnetic interaction structure forming plates includes one or more alignment features to assist with alignment.

9. The vacuum electron device of claim 1, wherein the vacuum electron device is configured for use in an RF amplifier or oscillator.

10. A method for fabricating one or more vacuum electron devices, the method comprising:

forming from a first non-magnetic electrically conductive material a first non-magnetic conductor plate having a first external surface and a first internal surface;

forming from a second non-magnetic electrically conductive material a second non-magnetic conductor plate having a second external surface and an second internal surface;

forming a radio-frequency (RF) interaction zone in each of a plurality of electrically conductive non-magnetic interaction structure forming plates;

stacking the plurality of electrically conductive non-magnetic interaction structure forming plates to form an RF interaction structure, the RF interaction zones together forming an RF interaction region for transmitting an electron beam;

disposing the first non-magnetic conductor plate, the RF interaction structure, and the second non-magnetic conductor plate in a stack such that the first external surface of the non-magnetic conductor plate and the second external surface of the second non-magnetic conductor plate are outside of the stack; and bonding the first non-magnetic conductor plate, the RF interaction structure, and the second non-magnetic conductor plate together.

11. The method of claim 10, further comprising:

forming a first magnetic plate from a first magnetic material and disposing at least one first magnet on or in it; and disposing the first magnetic plate on the first external surface of the first non-magnetic conductor plate, the at least one first magnet configured for controlling the electron beam in the RF interaction region.

12. The method of claim 11, further comprising:

bonding the first magnetic plate to the first non-magnetic conductor plate.

13. The method of claim 12, further comprising:

forming a second magnetic plate from a second magnetic material and disposing at least one second magnet on or in it; and disposing the second magnetic plate on the second external surface of the second non-magnetic conductor plate, the at least one second magnet configured for further controlling the electron beam in the RF interaction region.

14. The method of claim 13, further comprising:

bonding the second magnetic plate to the second non-magnetic conductor plate.

15. The method of claim 14, further comprising forming one or more pockets in the first non-magnetic conductor plate.

16. The method of claim 15, further comprising placing a getter material into at least one of the one or more pockets.

17. The method of claim 15, further comprising placing an electron emissive material into at least one of the one or more pockets.

18. The method of claim 15, further comprising placing a circuit sever material into at least one of the one or more pockets.

19. The method of claim 10, further comprising forming one or more alignment features in each of the first non-magnetic conductor plate, the second non-magnetic conductor plate and the plurality of non-magnetic interaction structure forming plates to assist with alignment.

20. The method of claim 10, wherein the vacuum electron device is configured for use in an RF amplifier or oscillator.

* * * * *